(No Model.) 2 Sheets—Sheet 1.
W. W. DUNNETT.
PIPING FOR BUILDING WALLS.
No. 438,068. Patented Oct. 7, 1890.
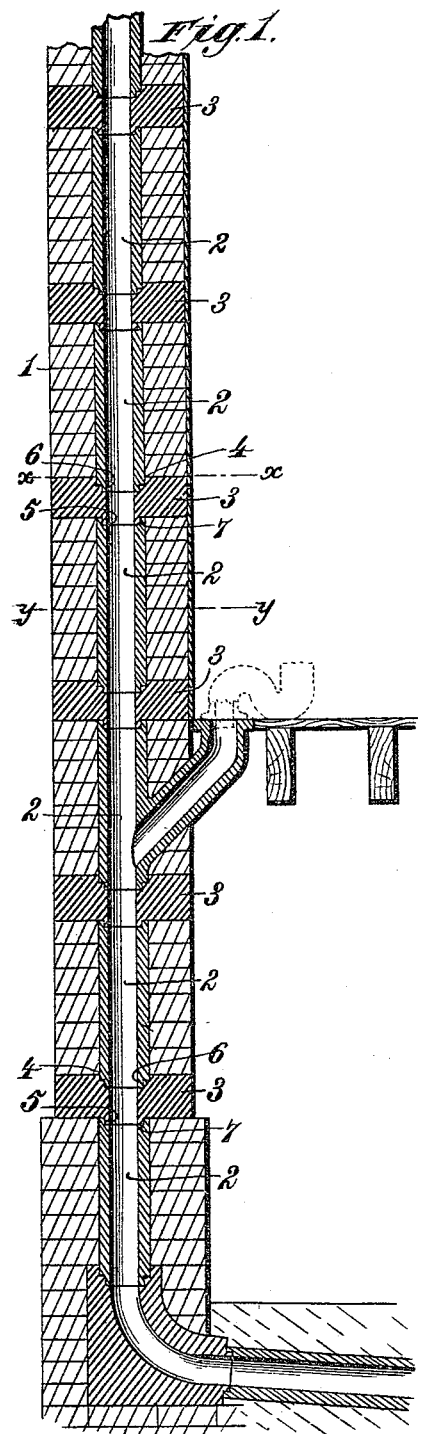
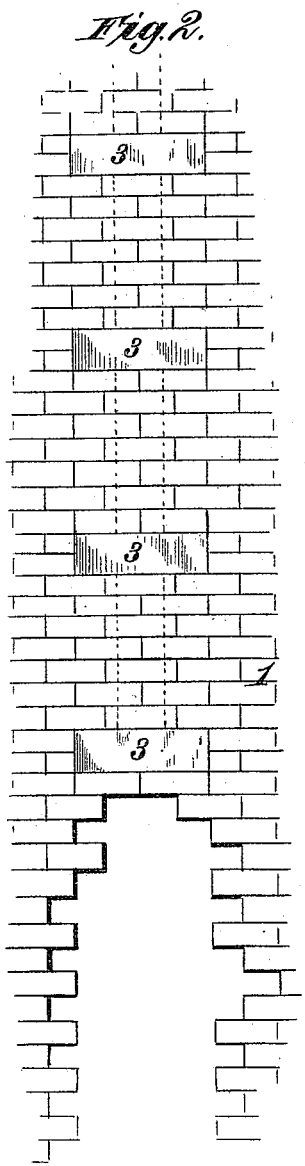
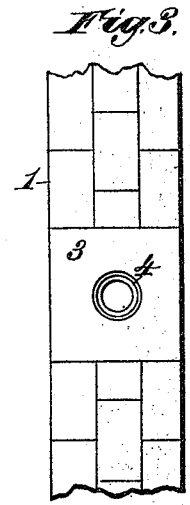
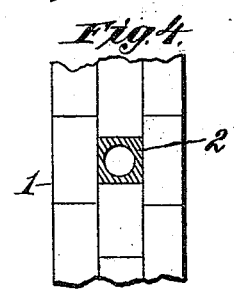
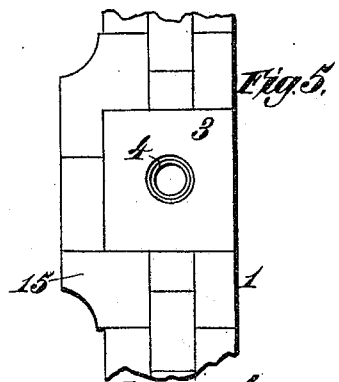
Witnesses.
Inventor:
William W. Dunnett.
By James L. Norris.
Atty.

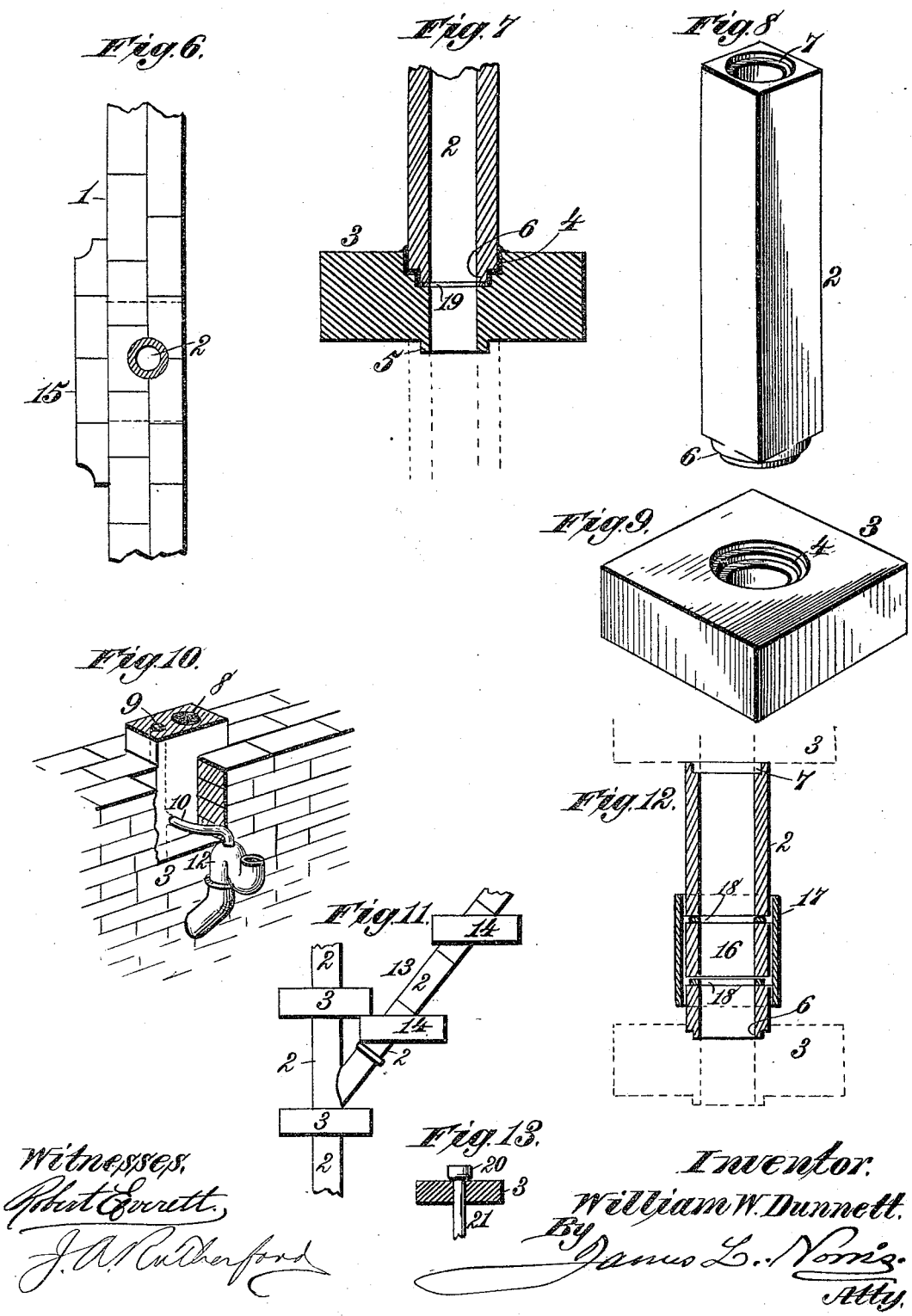

United States Patent Office.

WILLIAM W. DUNNETT, OF BALTIMORE, MARYLAND, ASSIGNOR OF ONE-HALF TO NICHOLAS M. RITTENHOUSE, OF SAME PLACE.

PIPING FOR BUILDING-WALLS.

SPECIFICATION forming part of Letters Patent No. 438,068, dated October 7, 1890.

Application filed June 19, 1890. Serial No. 355,954. (No model.)

*To all whom it may concern:*

Be it known that I, WILLIAM W. DUNNETT, a citizen of the United States, residing at Baltimore, in the State of Maryland, have invented new and useful Improvements in Piping for Building-Walls, of which the following is a specification.

This invention relates to waste-water piping of that type which is applied during the erection of building-walls for conducting waste water and soil to a sewer-pipe connection.

The object of my invention is to provide novel means whereby the waste-piping can be constructed of comparatively short sections of terra-cotta or like material, while admitting of the renewal of any section and the solid and substantial support of the remaining and undisturbed sections.

The invention also has for its object to provide novel means for connecting and supporting the sections of waste-piping in the brick wall of a building, whereby a pipe-section can be renewed, if occasion therefor should arise, by removing a comparatively small number of the bricks comprising the building-wall, the construction and arrangement being such that the piping above and below the section to be repaired will be firmly supported by separate pipe-connecting devices built into the brick wall and of a width co-extensive with the thickness of such wall, or approximately so.

The invention also has for its object to provide a separable pipe-connecting block which subserves the function and occupies the space of several bricks in erecting the brick wall, thereby economizing in the use of bricks while providing a removable pipe-connecting medium, which will sustain the piping firmly and substantially in correct position and permit any pipe-section to be renewed or repaired as occasion may demand.

The invention also has for its object to provide a novel connection of terra-cotta for the sections of terra-cotta piping built into the brick wall of a building during its erection, whereby the connections sustain the piping and permit the renewal of any section by simply displacing a number of bricks comprising the wall.

The invention also has for its object to provide for the renewal of a section of waste-piping built within the brick wall of a building without disturbing either the pipe-sections above and below or the connecting blocks or couplings of the section to be renewed.

The invention also has for its object to provide novel means whereby the opposite ends of each waste-pipe-section are joined by mortises and tenons to supporting-blocks built into the wall and of a width coextensive with the thickness thereof.

To accomplish all these objects, my invention involves the features of construction, the combination or arrangement of parts, and the principles hereinafter described and claimed, reference being made to the accompanying drawings, in which—

Figure 1 is a vertical sectional view of a portion of the brick wall of a building, showing my invention applied thereto. Fig. 2 is a detail elevation showing a portion of the brick-work displaced as when a waste-pipe connection has been removed for the application of a new or perfect section. Fig. 3 is a sectional view taken on the line $x$ $x$, Fig. 1. Fig. 4 is a sectional view taken on the line $y$ $y$, Fig. 1. Fig. 5 is a view similar to Fig. 3, showing a wall having a pilaster or projecting portion of brick-work to cover the outer edges of the pipe-connecting blocks. Fig. 6 is a similar view showing another form of brick-work pilaster or projection on a wall of reduced thickness. Fig. 7 is a detail sectional view, on a larger scale, showing a connecting-block and portions of two pipe-sections. Fig. 8 is a perspective view of a pipe-section which is square in cross-section. Fig. 9 is a detail perspective view of a pipe-connecting block. Fig. 10 is a detail perspective view, partly in section, showing a ventilating-flue in the terra-cotta-pipe section connected with a trap. Fig. 11 is a detail view showing a branch pipe connected with the perpendicular main waste-pipe. Fig. 12 is a detail sectional view showing the construction for renewing a pipe-section without disturbing the pipe-sections and connecting-blocks above and below. Fig. 13 is a detail sectional view of a modified construction for a ventilating-pipe.

In order to enable those skilled in the art to make and use my invention, I will now describe the same in detail, referring to the drawings, wherein—

The numeral 1 indicates the brick wall of a building comprising a thickness of three bricks, Figs. 1 to 5, inclusive, and the numerals 2 indicate sections of cylindrical waste-piping composed of terra-cotta or like material. These pipe-sections are comparatively short, and are supported and connected at their adjacent ends by square or rectangular blocks 3, of terra-cotta or other material, preferably the same substance as that of which the pipe-sections are made. The blocks are each formed with a central through-orifice of the same diameter as the internal caliber of the pipe-sections, and in its upper side is provided with a circular stepped mortise 4, (best seen in Figs. 7 and 9,) while the opposite side of the block is provided with a circular tenon 5. The pipe-sections are formed at one end with a tenon 6 and at the opposite end with a mortise 7, which are respectively fitted to the stepped mortise 4 and tenon 5 of an upper and lower block 3. The pipe-sections and blocks are built into the brick-work during the erection of the building-wall, and the blocks are of a width coextensive with the thickness of such wall, whereby such blocks constitute substitutes for many bricks to economize in the use thereof, while performing their function of supports and connections for the ends of the pipe-sections. The blocks may be square, or they may be rectangular, and the pipe-sections may be cylindrical, or they may be square or of other polygonal form in cross-section, as in Figs. 8 and 10.

The pipe-sections may be formed with two longitudinal passages, as in Fig. 10, one for the flow of the waste water or soil and the other for the passage of air, in such manner that the aligned pipe-sections constitute a waste-conduit, as at 8, and also a ventilating-flue, as at 9, the latter being connected by a tube 10 with an ordinary water-closet or other trap, as at 12, Fig. 10.

A branch 13 may be built into the brick wall during its erection, such branch being connected with one of the vertical pipe-sections 2 and supported and connected by blocks 14, constructed and applied the same as the connecting and supporting blocks 3 for the vertical pipe-sections. This branch, one or more, may lead to any floor or to any part of the building for such purposes as may be necessary.

The tenoned ends of the pipe-sections may be fitted water and gas tight into the stepped mortises of the connecting and supporting blocks by packing-rings of any desired material or substance, as in Fig. 7, and likewise the mortised ends of the pipe-sections may be packed upon the tenons of the blocks.

If the outer edges of the blocks are exposed at the surface of the brick wall, they may be glazed or ornamented to present a distinguishing and striking appearance; but the outer edges may be covered and concealed by a pilaster or projecting part of the brick-work, as at 15, Figs. 5 and 6. By my invention a pipe-section, one or more, may be renewed or repaired by simply removing a comparatively small portion of the brick-work directly opposite the pipe-section requiring attention. This section can then be removed without disturbing any part of the piping above or below, the remaining portions of such piping being firmly supported by the connecting-blocks. If a pipe-section be removed without displacing its upper and lower supporting-blocks, it would be difficult, if not impossible, to apply a new section made in a single piece, and therefore I have devised simple means for applying the new section, which consists in making it in three parts, as in Fig. 12, the intermediate part being a tube-section 16, and confined by a sliding sleeve-like part 17. It will no doubt be obvious that the upper and lower parts can be fitted to the tenon and mortise of the upper and lower blocks 3, the sleeve 17 raised on the upper part, the tube 16 inserted into correct alignment and the sleeve lowered over the same to confine it in place. To avoid leakage, the ends of the tube-section 16 should be packed, as at 18, to make gas and water tight joints.

By constructing the connecting and supporting blocks 3 of a width coextensive with the thickness of the wall they occupy the place of many bricks and are so bound in by the brick-work as to render accidental displacement impossible. The blocks not only support and connect or couple the pipe-sections, but they subserve the purpose of bricks in the erection of the wall, thereby economizing in the use of bricks.

I have specifically described my invention as applied to a wall of brick-work; but obviously the walls may be of stone or any known type of building-blocks, and likewise the connecting and supporting blocks and the pipe-sections may be formed of earthenware or any other known material for the conditions required.

An important feature of my invention resides in the fact that the great weight of a vertical line of piping is distributed to and borne by many blocks built into the wall, in consequence of which the uppermost pipe-sections do not sustain the weight of the lowermost pipe-sections. On the contrary, each pipe-section is supported entirely independent of the others, and hence there is no crushing strain on the line of piping due to the weight thereof.

The packed joint for the end of each pipe-section is the same as indicated by the numeral 18 in Fig. 7. In producing this joint I first introduce a ring 19 of asphaltum, then pour in hot asphaltum to seal the joint, and pack in cement to strengthen the same. While I prefer this type of asphaltum joint I do not confine myself thereto, as other packing materials could be employed.

Instead of constructing the waste-pipe sections with the ventilating-passage, I may make the ventilating-pipe a separate structure. The ventilating-pipe may pass through the supporting-block, as indicated in Fig. 13, where the bell-mouth 20 of a ventilating-pipe section 21 rests on the block.

Having thus described my invention, what I claim is—

1. In piping for buildings, the combination of the separable connecting and supporting blocks built into the wall of a building and bound by the building-bricks, with the pipe-sections having their ends joined to the blocks and communicating therethrough, substantially as described.

2. In piping for buildings, the combination of the separate connecting and supporting blocks built into a wall and having a width coextensive therewith, or approximately so, with the pipe-sections having their ends mortised and tenoned to the blocks, substantially as described.

3. In piping for buildings, the combination of the blocks having stepped mortises and tenons and built into the wall of a building, with the pipe-sections having tenons and mortises, respectively, fitted to the stepped mortises and tenons of the blocks, substantially as described.

4. In a piping for buildings, the combination of the polygonal blocks built into and bound by the bricks of a building-wall and coextensive with the thickness thereof, or approximately so, with the pipe-sections having their ends fitted to the blocks and communicating therethrough, substantially as described.

5. In piping for buildings, the combination of the polygonal blocks built into and bound by the bricks of a building-wall, with the pipe-sections fitted to the blocks and each formed integral with a longitudinal ventilating-flue and a waste-water conduit or passage, substantially as described.

6. In waste-piping for buildings, the combination of the connecting and supporting blocks built into and bound by the brickwork of a building-wall, with the pipe-section comprising end parts, an intermediate tube-section, and a sliding sleeve for holding the latter in alignment with the end parts, substantially as described.

7. A waste-pipe section for building-walls, consisting of end parts, an intermediate tube-section, and a sliding sleeve for securing the latter in alignment with the end parts, substantially as described.

In testimony whereof I have affixed my signature in presence of two witnesses.

WILLIAM W. DUNNETT.

Witnesses:
THOS. KELL BRADFORD,
H. K. BROWN.